United States Patent [19]
Lovejoy

[11] 3,838,960

[45] Oct. 1, 1974

[54] APPARATUS FOR MAKING INJECTION MOLDED ARTICLES

[75] Inventor: Walter R. Lovejoy, Elmhurst, Ill.

[73] Assignee: Beatrice Foods Co., Chicago, Ill.

[22] Filed: Aug. 16, 1973

[21] Appl. No.: 388,882

Related U.S. Application Data

[60] Division of Ser. No. 219,637, Jan. 21, 1972, and a continuation-in-part of Ser. No. 883,010, Dec. 8, 1960.

[52] U.S. Cl.............. 425/242 R, 249/162, 249/165, 425/441, 425/450
[51] Int. Cl............................................. B29c 1/14
[58] Field of Search .......... 425/242, 249, 436, 438, 425/441, 450, DIG. 221; 249/161, 162, 165, 66

[56] References Cited
UNITED STATES PATENTS

| | | |
|---|---|---|
| 3,473,197 | 10/1969 | Wilds et al...................... 425/438 X |
| 3,509,603 | 5/1970 | Halsall et al........................ 425/249 |
| 3,585,690 | 6/1971 | Tucker............................... 425/139 |

*Primary Examiner*—J. Spencer Overholser
*Assistant Examiner*—David B. Smith
*Attorney, Agent, or Firm*—James P. Hume

[57] ABSTRACT

Apparatus is disclosed for injection molding a polygonal container having plural side walls, an open top and a closed bottom. First and second mold platens are relatively movable between open and closed positions and each includes interlock means. A side wall mold means includes separable wall segments that interfit with both interlock means when the platens are in their closed positions in order to securely locate the sidewall members against the injection pressures and that move laterally outwardly of one another and longitudinally out of engagement with both of said interlock means when said mold platens are in their open position. Other features are disclosed.

9 Claims, 11 Drawing Figures

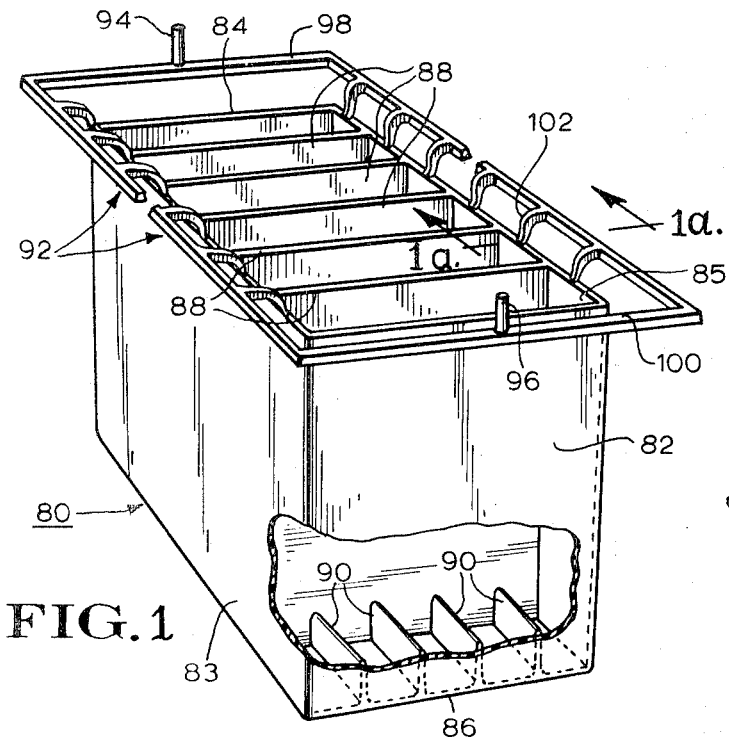
FIG. 1
FIG. 1a
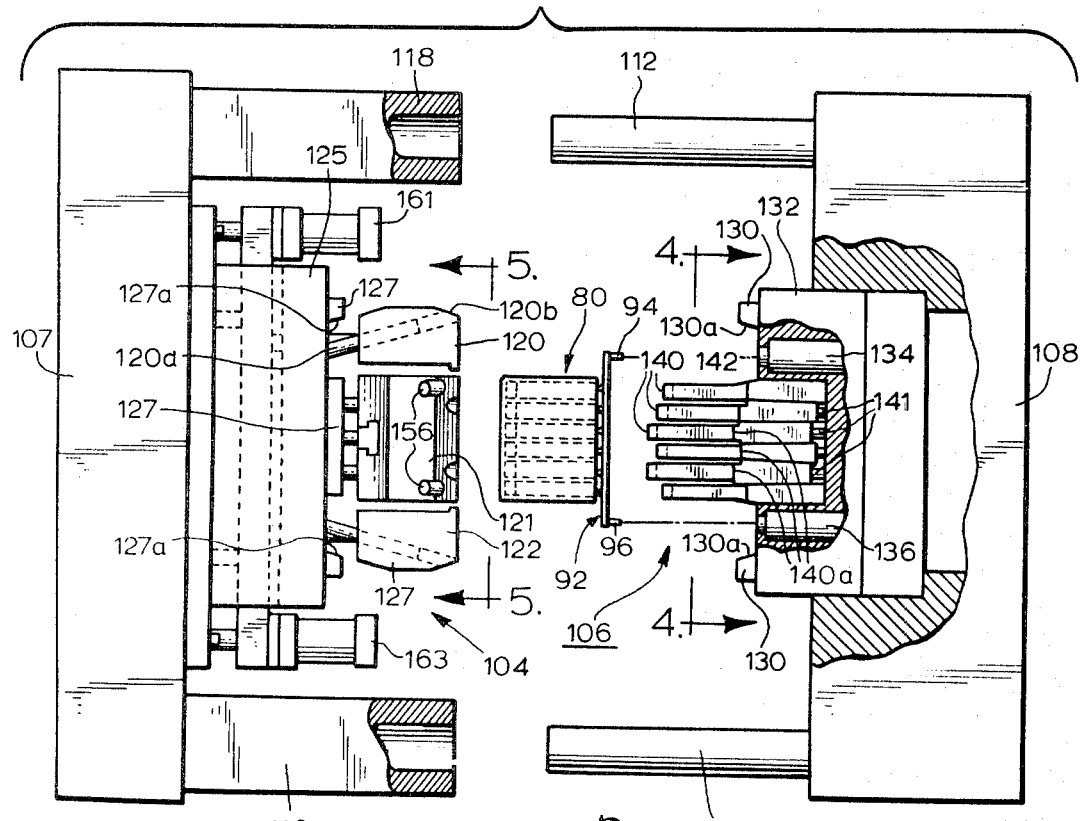
FIG. 2

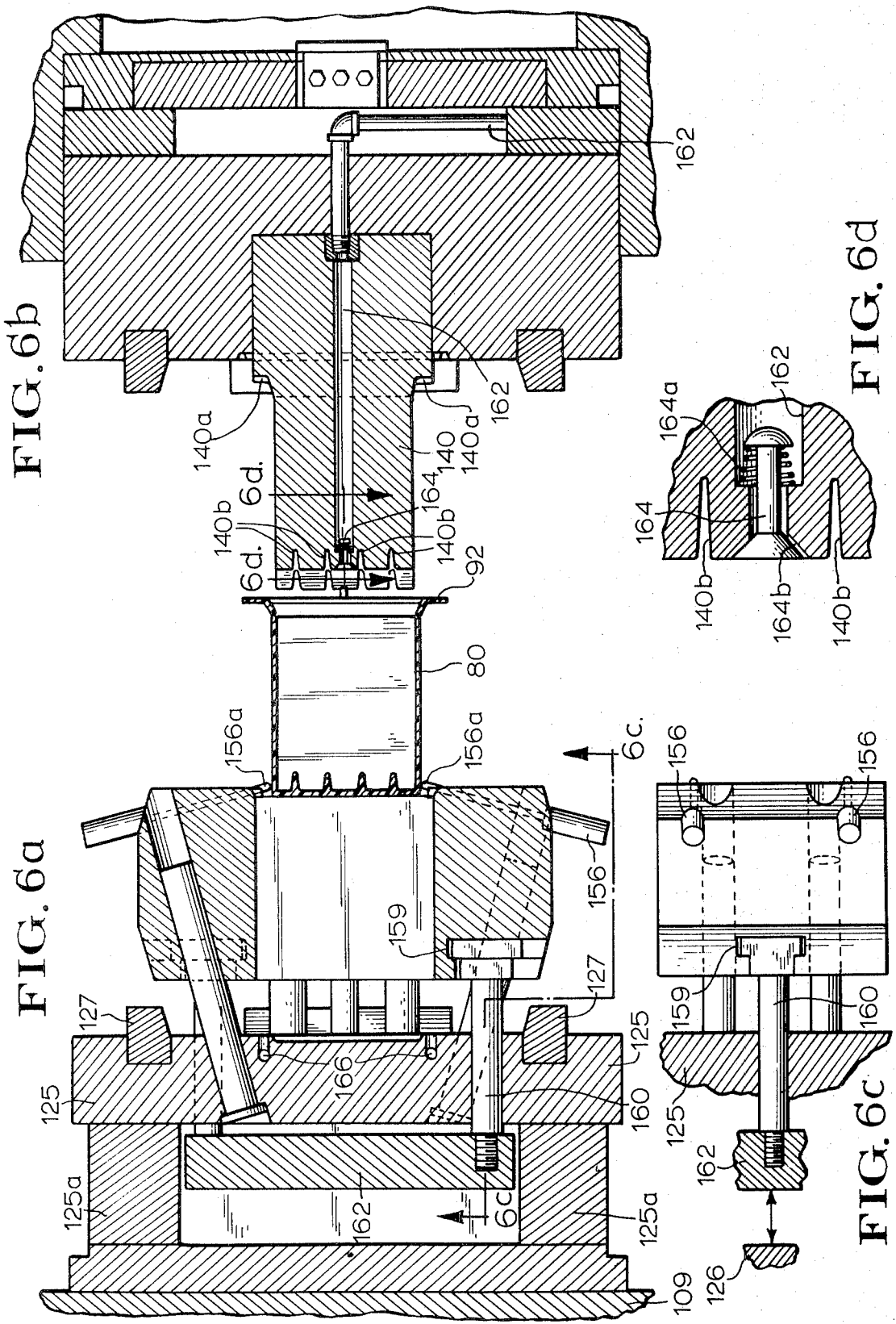

ial application Ser. No. 219,637, filed Jan. 21, 1972 which is in turn a continuation-in-part of application Ser. No. 883,010 filed Dec. 8, 1969 entitled "Method and Apparatus for Manufacture of Battery Casing or the Like" and assigned to the same assignee as the present invention.

APPARATUS FOR MAKING INJECTION MOLDED ARTICLES

CROSS-REFERENCE TO RELATED APPLICATION

The present application is a division of application Ser. No. 219,637, filed Jan. 21, 1972 which is in turn a continuation-in-part of application Ser. No. 883,010 filed Dec. 8, 1969 entitled "Method and Apparatus for Manufacture of Battery Casing or the Like" and assigned to the same assignee as the present invention.

INTRODUCTION

The present invention relates generally to apparatus for manufacturing plastic articles and particularly hollow container-like articles of a polygonal configuration. More specifically, the invention is directed to new and improved apparatus for injection molding of containters such as a partitioned battery casings and the like.

SUMMARY OF THE INVENTION

The present invention provides a mold structure of a simple and economical construction that avoids the necessity for a large yoke typically used in prior art molds to support movable side wall members of the mold structure.

Accordingly, the invention is directed to an injection mold for manufacture of a plastic article having a plurality of side walls and only one end wall forming a generally polygonal enclosure with an open top. Specifically, the mold comprises a first mold means having a mold defining surface corresponding to at least a predetermined portion of the exterior dimensions of the article including the end wall thereof and further having first interlock means. Second mold means are provided having a mold defining surface corresponding to at least a predetermined portion of the interior dimensions of the article and further having second interlock means and movable relative to said first mold means between closed and open positions. There is further provided side wall means comprising a plurality of separable side wall members movable between a closed position in which said side wall members interfit with said first and second interlock means to securely locate the side wall members relative to the first and second mold means and in which the side wall members cooperatively form a mold defining surface corresponding to the exterior dimensions of at least a portion of the plural side walls of the article and an open position in which the side wall members are displaced both laterally outwardly and longitudinally of their closed position and are located in spaced relation to both said first and second interlock means.

Other aspects and features of the methods and apparatus of the present invention are disclosed in claims later herein.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 1 depicts a partitioned container having still annexed thereto cold runner waste material which serves to illustrate the gating technique that was used for injection molding the container;

FIG. 1a is an exploded, sectional view taken along lines 1a — 1a of FIG. 5;

FIG. 2 is a plan view, partly in section of a preferred mold structure according to the teachings of the present invention;

FIGS. 6a and 6b are side elevational views, in section, of the mating mold members taken along lines 6a—6a and 6b—6b of FIGS. 4 and 5, respectively;

FIG. 6c is a sectional view taken along lines 6c—6c of FIG. 6a; and

FIG. 6d is an exploded, detail view of one structural features of the mold taken along lines 6d—6d of FIG. 6b.

DESCRIPTION OF THE PREFERRED EMBODIMENTS

Figure 3:
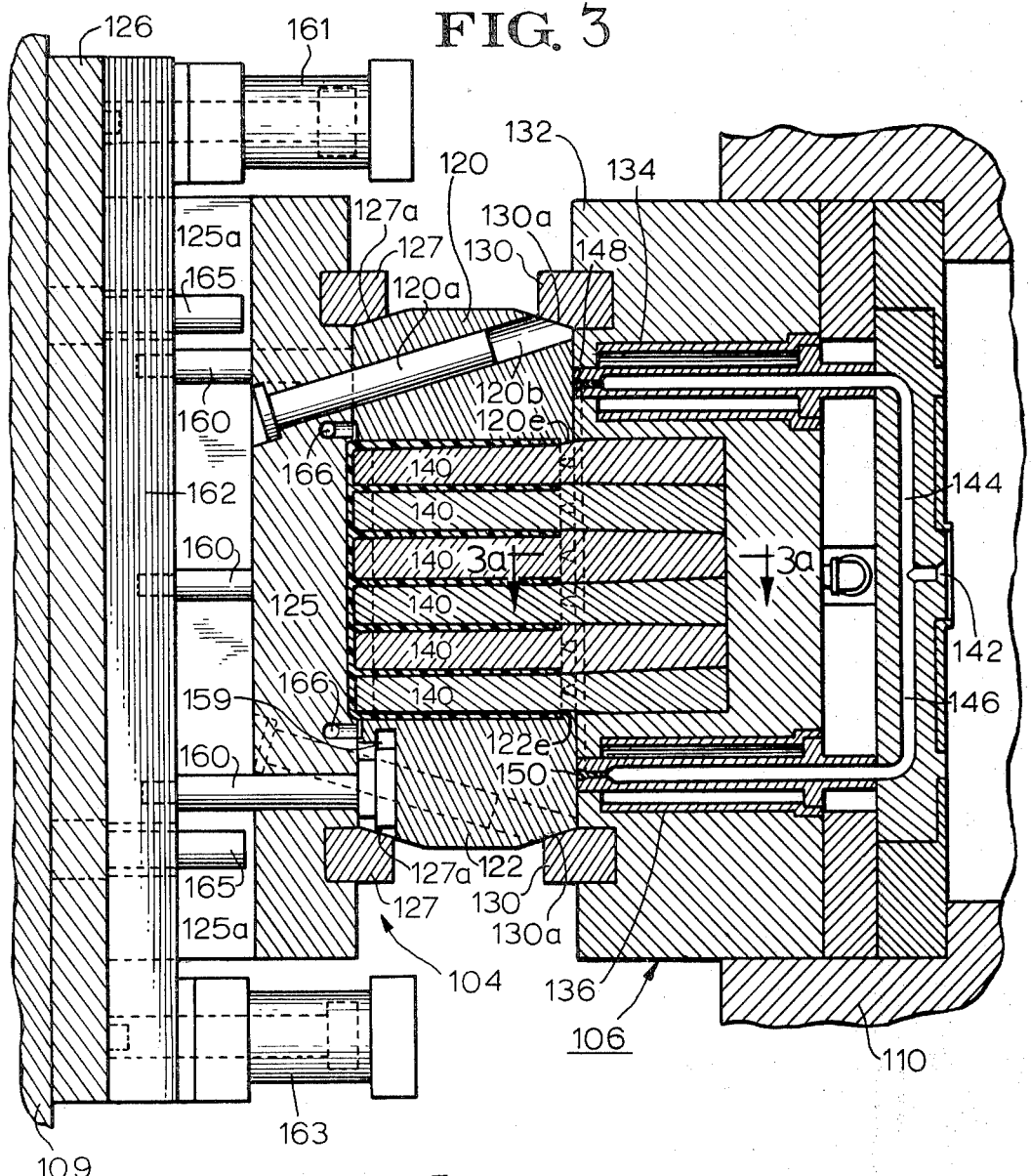
FIG. 3 is a plan, sectional view similar to FIG. 2 but showing the mold structure in a closed position.

Referring now to FIG. 1, there is illustrated a container 80 manufactured by the apparatus of the present invention. The container 80 is a polygonal enclosure of a rectangular, box-like configuration having four sidewalls 82-85. The container 80 further includes a closed bottom wall 86 and an open top through which are visible the upper portions of a plurality of laterally spaced partition walls 88. The partition walls 88 extend between the spaced container sidewalls 83 and 85 and serve to divide the container into a plurality of cells. Each cell, like the exemplary cell visible in the drawing, may be provided with a plurality of laterally spaced reinforcing ribs 90 extending across the width of the cell perpendicular to the partition walls 88.

The preferred method of gating a mold cavity to produce the container 80 may be appreciated in at least general terms by consideration of the cold runner waste material that is still affixed to the container 80 adjacent its open top and designated generally in the drawing by the reference numeral 92. As is well known to those skilled in the art, the waste material 92 is formed in the unheated or cold runner portion of the flow path for the thermoplastic material and must be removed from the mold structure along with the molded container on each cycle of operation. Each point of affixation of the cold runner material 92 to the container 80 denotes an inlet gate through which the thermoplastic material is introduced from the cold runner system into the mold cavity.

Thus, as will presently be seen, the molten thermoplastic material is injected into the mold structure through a primary inlet sprue and is maintained in a heated condition until it exits from a pair of secondary sprues into a pair of cold runner inlet channels defined by the vertical cold runner segments 94 and 96 in FIG. 1. The vertical cold runner segments 94 and 96 are connected to the center base portions of a pair of similar U-shaped cold runners 98 and 100. The base portions of the U-shaped cold runners 98 and 100 are parallel to and spaced outwardly from the sidewalls 84 and 82, respectively, of the casing 80. Similarly, the opposed leg portions of the facing U-shaped runners 98 and 100 are parallel to and spaced laterally outwardly from their associated sidewalls 83 and 85. Each of the opposed leg portions of the cold runners 98 and 100 include, in the present embodiment, three laterally spaced gate inlet portions integral with an associated leg of the cold runner and fixed to the container at its open top. An exemplary one of the cold runner inlet gates 102 is illustrated in FIG. 1 and in the exploded detailed view of FIG. 1a.

As may be appreciated from FIGS. 1 and 1a, all of the inlet gates are disposed in a generally common plane about the open top of the container. Furthermore, as is readily visible from the drawing, the cold runner inlet gates connect to the container 80 at spaced intervals along the opposite sidewalls 83 and 85 intermediate respective adjacent pairs of the partitioned walls 88.

Although the U-shaped cold runners 98 and 100 depict the presently preferred arrangement for communicating the thermoplastic material to the individual inlet gates, it will be recognized by those skilled in the art that a variety of other runner means may be used consistent with the more basic concepts of the present invention. Furthermore, it will be recognized that the inlet gates, like gate 102, need not connect directly to the peripheral rim of the open top of container 80 as shown, but may connect to the various container sidewalls. It is important only that gating be accomplished at or near what is to become the open top of the partitioned container.

A preferred mold structure facilitating the gating method depicted by FIG. 1 and incorporating a variety of structural features of the invention is illustrated in FIG. 2. The mold structure comprises a first and second mold means generally designated in the drawing by the reference numerals 104 and 106, respectively. The mold means or mold sections 104 and 106 are carried by conventional, respective platens 107 and 108 that form part of a conventional hydraulic or pneumatic press, not shown. As is well understood in the art, the hydraulic press is operative for moving the platens and thus the first and second mold sections 104 and 106 between a closed or mating position wherein the mold sections are in intimate association and an open position as depicted in FIG. 2 in which the mold sections are separated to allow the molded container to be removed from the mold cavity. Proper mating of the mold sections 104 and 106 is assured by the provision of guide means comprising pairs of large guide rods 112 and 114 carried by the platen 106 and complementary guide sleeves 116 and 118 carried by the platen 108.

The first mold means 104 comprises four sidewall members, three of which 120–122 are visible in FIG. 2. All of the sidewalls members 120–123 are visible in FIG. 5. These sidewall members and a first transverse end wall member defined by the adjacent face of a base or support plate 125 cooperate to define a rectangular mold cavity conforming to the desired exterior dimensions of the container 80. The four sidewall members 120–123 are movable from a closed position in which they are contiguous the face of plate 125 to an open position as shown in FIG. 2 wherein each of the sidewall members 120–123 is displaced away from plate 125 and laterally outward of its closed position. Each of the sidewall members 120–123 is confined to follow a specific path in moving between its open and closed positions by means of pairs of guide posts which ride in complementary bores of each sidewall member. The guide posts and bore arrangement for sidewall member 120 is exemplary of the corresponding structure of the remaining sidewalls and includes the guide post 120a slideably journalled in the complementary sidewall bore 120b. As may best be appreciated by momentary reference to FIG. 3, the exemplary guide post 120a is similar to a large bolt entering the backside of base plate 125 and extending therethrough and into the bore 120a. The post 120a is threadably or otherwise rigidly secured to base plate 125. The other guide post and bore arrangement 120c and 120d, respectively, for sidewall 120 is visible in FIG. 5. The stationary base plate 125 is rigidly secured to a second base plate 126 and in spaced relation thereto by means of spacers 125a, two of which are visible in FIG. 3. The second base plate 126 is in turn removeably bolted to the platen 109. The control mechanism for displacing the sidewall members between their open and closed positions will be explained later herein.

Figure 5:
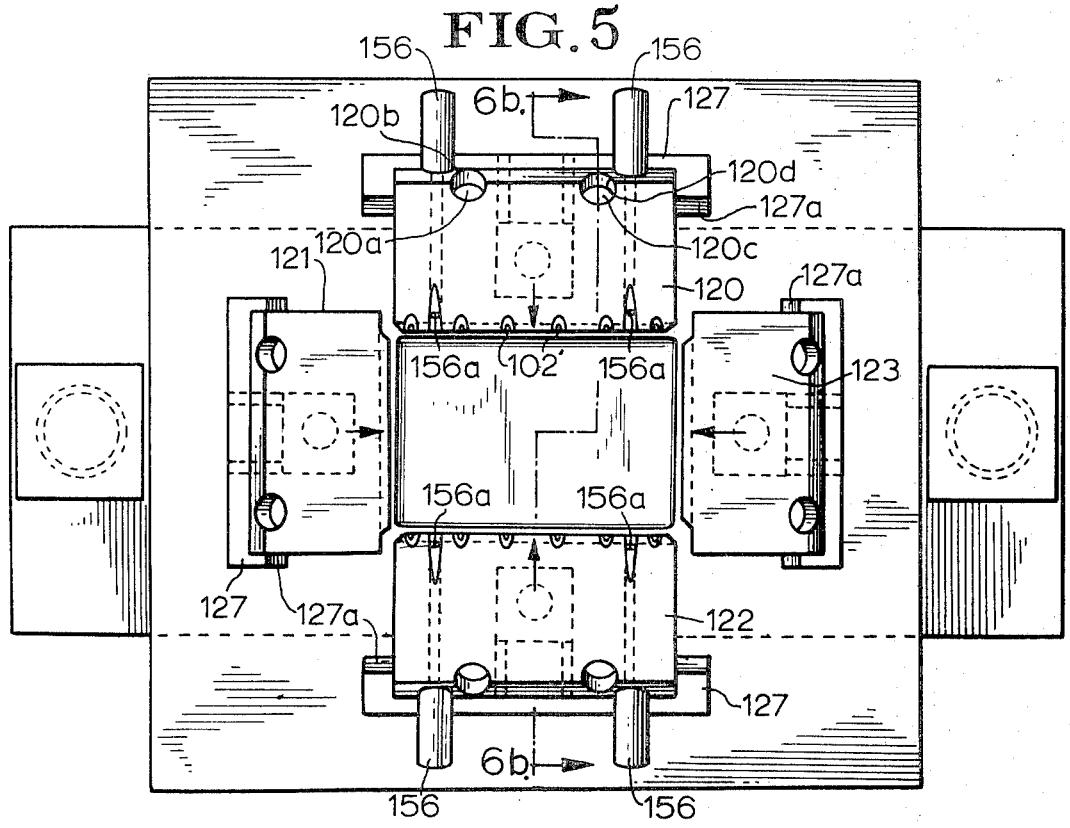
FIG. 5 is a view of the other mating section of the mold structure taken along lines 5—5 of FIG. 2.

It will be recognized that the sidewall members 120–123 are not supported within an outer support block or yoke. The elimination of this block results in a substantial simplification and economy in construction of the mold. In order to securely retain the sidewall members in proper position under the extreme pressures encountered during injection of a molten thermoplastic material into the mold cavity, the mold structure of the invention includes cam type interlocking means comprising four similar and comparatively small retaining blocks 127 rigidly to secure to base plate 125, as seen in FIGS. 2–3 and 5. Each of the retaining blocks 127 includes a sloped cam face portion 127a which engages a complementary sloped face portion of an associated sidewall member as the sidewall members are moved into their closed position in engagement with the base plate 125. The sidewalls 120 and 122 are shown in FIG. 3 in locked engagement with their associated retaining blocks 127 while in FIG. 2 they are displaced outwardly of the blocks in their open position.

Figure 4:
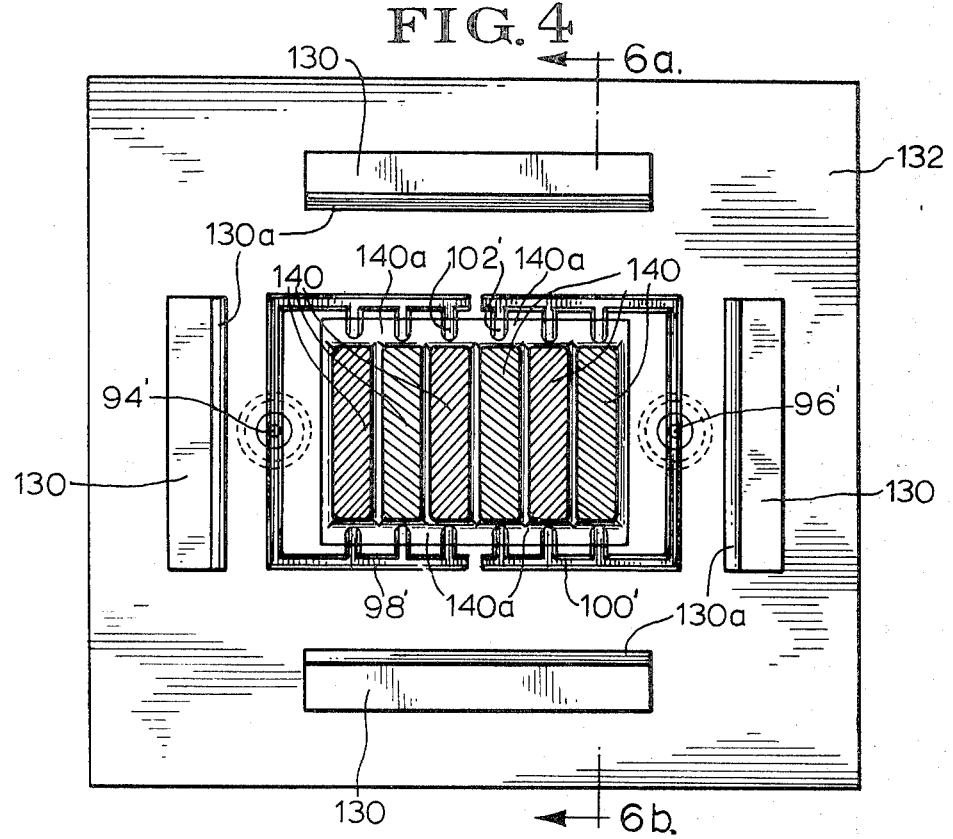
FIG. 4 is a view of one section of the mold structure taken along lines 4—4 of FIG. 2.

A similar set of four retianing blocks 130 arranged in a rectangular array (FIG. 4) are rigidly secured to a large support block 132 of the second mold means 106 to form another interlock means. The sloped internal cam faces 130a of the blocks 130 engage the mating sloped faces of the sidewall members when the mold sections 104 and 106 moved into intimate engagement as seen in FIG. 3. The cooperative influence of the retaining block groups 127 and 130 in conjunction with the associated mating cam faces of the sidewall members 120–123 serve to retain the sidewalls in their proper position despite extreme outward forces encountered during injection of the thermoplastic material into the mold cavity.

The second mold means 106, as has already been seen, comprises a support block 132 to removably bolted platen 110.

Referring to FIG. 2, the support block 132 carries a plurality of laterally spaced core elements 140, the space between adjacent pairs of the cores corresponding in thickness to the partition walls of the container to be formed. The peripheral dimensions of cores 140 are smaller than the corresponding internal dimensions of sidewall members 120–123 by an amount equal to the peripheral wall thicknesses of container 80. For reasons presently to be explained, the outermost cores 140 are rigidly secured to block 132 while the inner cores 140 are normally biased in a leftward direction in the drawing, the extent of displacement of each inner core corresponding to the disparity in height between such inner core and the fixed outer cores. Specifically, each of the inner cores 140 is normally biased to a stop position under the influence of an associated spring 141. Counting from the topmost core of FIG. 2, cores two and four are biased equal distances while cores three and five are biased equal but lesser distances than cores two and four. Each of the inner cores includes a shoulder abutment on its opposite sides, one of said abutments 140a for each core being visible in FIG. 2 while both abutments for each inner core are visible in FIG. 4. The abutments 140a are intercepted by sidewall members 121 and 123 when the mold sections 104 and 106 are moved to their mated or closed positions thereby displacing the inner cores against the opposing force of their respective bias springs into positions of equal height alignment with the fixed outer cores. The base portions of the cores 140 situated within the block 132 are tapered, as seen in FIGS. 2 and 3, to prevent excessive scrubbing or binding of the cores 140 as they move relative to one another.

When the cores 140 are displaced to their equal height positions as seen in FIG. 3, the root portions of the cores cooperate to define a second transverse end wall of the mold cavity which is spaced from and parallel to the first transverse end wall defined by the face of base plate 125. The second transverse end wall corresponds to the open top of the container 80 to be formed. The transverse faces of the free ends of the cores 140 are provided with grooves 140b, as may only be seen in FIGS. 6b and 6d, to form the reinforcing ribs 90 of the container 80 (FIG. 1).

Again referring to FIG. 3, an understanding may be had of the gating means of the mold structure. The molten thermoplastic material such as polystyrene, cellulose acetate or polypropylene is introduced into the mold structure from the backside of the support block 132 through a primary inlet sprue 142. The inlet sprue 142 promptly divides into a pair of oppositely directed hot runner channels 144 and 146. The hot runner channels 144 and 146 initially extend parallel to the front face of the support block 132 and then at respective points beyond the outer limits of the mold cavity turn abruptly to extend toward the front face of the block 132 whereat they terminate in respective sprues 148 and 150. Conventional cartridge heater elements 134 and 136 surround the respective hot runner channels 144 and 146 to maintain the thermoplastic material therein in a molten condition.

The sprues 148 and 150 coupled to a cold runner means which in large measures are sculptured in the front face of the support block 132. The structure of the cold runner system may best be appreciated by momentary reference to FIG. 4 wherein cold runner channels are identified by the same reference numerals with the addition of primes as used to identify the cold runner waste material formed in these channels and illustrated in FIG. 1 by numerals 92, 98, 100 and 102. Specifically, the molten thermoplastic material from the sprues 148 and 150 enters the cold runner channel system at 94' and 96' respectively. A pair of similar and facing U-shaped cold runner channels 98' and 100' formed by grooved depressions in the surface of the front face of supprot block 132 are coupled at the midpoint of their resspective base portions to an associated one of the vertical cold runner channels 94' and 96'. The thermoplastic material which flows in the cold runner channels 98' and 100' ultimately enters the mold cavity through inlet gate means comprising a plurality of inlet gate channels, an exemplary one of which 102' is identified in the drawing of FIG. 4. A portion of each inlet gate 102' lies in a common plane with the U-shaped channels 98' and 100' and is likewise defined by a grooved depression in the face of the block 132.

Figure 3A:
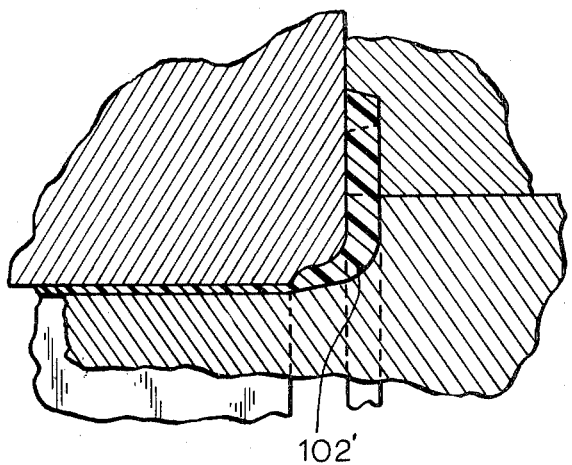
FIG. 3a is an exploded detail view depicting one of the inlet gates of the mold cavity.

However, as can be appreciated by momentry reference to FIG. 1, the inlet gate waste material 102 departs from the plane of the U-shaped cold runner waste material 98 and 100. Thus, in corresponding fashion, the remaining portion of the inlet gate channels 102' are formed by bores in the opposed mating surfaces of the sidewall members 120–123, as may be appreciated by reference to FIGS. 3 and 3a. The inlet gates 102' enters the mold cavity through comparatively small apertures and at points lying approximately in the plane of the open top of the container to be formed. It will be appreciated by those skilled in the art that the point of injection of the molten material into the mold cavity may vary somewhat below the open top without unduly complicating construction of the mold or detracting from the gating method of the present invention. The mold structure is depicted in FIG. 3 with the sections of the mold in their mated or closed position and with the thermoplastic material having been injected into the mold cavity to form a molded container therein.

The primary means for ejecting a molded container from the mold structure is partly visible in FIG. 3, and includes inwardly extending ledges 120e and 122e of the sidewall members 120 and 122, respectively. These ledges together with the corresponding ledge portions of the sidewall members 121 and 123 overlie the perimeter of the open top of the molded container 80 formed within the mold cavity. Divergent movement of the mold sections 104, 106 thus results in the container being stripped from the cores 140. The inner cores 140 also move toward their extended positions of FIG. 2 with divergent movement of the mold secitons.

Further details of the structure of the first mold means may be appreciated by reference to FIG. 5. The sidewall members 120–123 are there shown in their open positions in which the corners of adjacent sidewalls have mvoed out of engagement with one another by a sufficient amount to release undercuts on the sruface of the molded container thereby allowing the molded container to fall free of the mold. Assuming the sidewall members 120–123 were not displaced to their outward or open positions until the molded container is stripped completely from the core elements, it would be necessary for an operator to reach into the space between the four sidewalls on each operating cycle to withdraw the molded container. This procedure is obviated in accordance with the present invention and automated removal of the container from the mold assembly facilitated by provision of secondary ejector means supported by the first mold means 104. Specifically, the secondary ejector means comprises a pair of elements 156 mounted on each of the opposed sidewall members 120 and 122. Gripper fingers 156a extend through guide passages in their associated sidewall members and are selectively actuable in unison to grasp oppostie sides of the container, as seen in FIG. 6a.

It is preferred that the sidewall members 120–123 remain in their closed positions during the major portion of the separating movement between the first and second mold means thereby permitting the internal ledges on each of these sidewall members to strip the molded container from the cores 140. However, once the container has been stripped from the major length of the cores 140, the sidewall members 120–123 are displaced to their open or laterally separated position (FIGS. 2 and 5) and the gripper fingers 156a are actuated to grasp the container adjacent its bottom wall and to complete the stripping procedure, as again seen in FIG. 6a.

The mode of operation of the secondary ejector means and certain further features of the invention may best be appreciated by reference to FIGS. 6a–d. Referring first to FIG. 6a, the gripper fingers 156a of the secondary ejector means 156 are shown gripping an exemplary molded container 80' near its bottom wall. The mold sections have separated sufficiently such that the casing 80' is entirely clear of the core members 140. The secondary ejector means 156 are at this point de-energized causing the fingers 156a to release the casing 80' so that it falls freely from the mold. A conveyor or the like beneath the mold may be provided for automatic handling of the ejected containers. Additionally, means may be provided on the mold structure for automatically severing the cold runner waste material 92 from the container.

The details of the mechanism for displacing the sidewall members 121, 120–123 between their open and closed positions is best seen in FIGS. 6a–6c. The face of each sidewall member positioned in opposed relation to the face the base plate 125 is provided with a bore of a T-shaped cross-section for loosely journaling the head of a similarly configured push rod 160. The push rods 160 have elongated shaft portions that are journaled in respective bores of plate 125. The push rods are operative to displace an associated sidewall between its open and closed positions. In order to assure that the sidewalls move in unison and that their outward travel is limited, the remaining end of the push rods is threadably secured to an actuator plate 162. The actuator plate 162 is selectively actuable by a conventional hydraulic piston and cylinder arrangements 161 and 163 (FIG. 3) for movement between an open position illustrated in FIG. 6a in which the actuator plate 162 is adjacent the backside of base plate 125 and a closed position illustrated in FIG. 3 in which the actuator plate is adjacent the second base plate 126 and sidewall members 120–123 firmly contact the face of base plate 125. The actuator plate is apertured so as not to interfere with spacers 125a and moves between its spaced positions along guide posts 165 secured to the second base plate 126.

Referring now to FIGS. 6b and 6d, a further feature of the invention is illustrated. Specifically, it is desirable in certain instances to provide further assistance in the ejecting of the container from the mold. To this end, there is provided a passageway 162 extending from the back portion of the second mold means 106 through the length of one or more of the core members and opening into the mold cavity through one or more valve structures 164 at the transverse top of one or more of the core elements 140. Air under high pressure is introduced into the mold cavity through the passageway 162 and the valve structure 164 during the ejection procedure so as to develop a pneumatic force tending to displace the molded container from the cores.

The valve structure 164 as seen in FIG. 6d is of a conventional tappet type construction having a tapered head which seats flush with the top surface of the core element Valve 164 is normally maintained in its closed position under the influence of a bias spring 164a. The valve 164 opens against the bias of spring 164a in the presence of a sufficiently high air pressure within passageway 162.

In accordance with the present invention, the valve structure 164 is constructed to perform an additional and important function during each molding cycle. Specifically, as thermoplastic material is injected into the mold cavity under high pressure it is necessary that air within the cavity be permitted to escape or that a vacuum be drawn within the cavity. To this end, a flat 164b is ground on one side of the valve structure 164 to provide a very small opening from the passageway 162 into the mold cavity even when the valve 164 is closed. During the injection portion of the operating cycle a vacuum pump is connected to the passageway 162 to thereby draw vacuum within the mold cavity. The flat 164b creates a sufficiently small opening such that thermoplastic material is not drawn into the passageway 162.

As an alternative or supplement to the valve structure 164, inlet channel means may be provided about the perimeter of the mold cavity, preferably adjacent the closed end of the container to be formed for drawing a vacuum upon introduction of the thermoplastic material into the cavity. A pair of such inlet channels 166 are illustrated in FIG. 10a; the channels are also visible in FIG. 3. Typically, as many as six or eight such channels may be provided at spaced intervals about the perimeter of the mold cavity. Each inlet channel includes a first passageway portion formed internally of the block 125 and leading to an external vacuum pump system (not shown) and a second connecting passageway portion formed between the interface of the sidewall members 120 and the mating face portion of the block 125. To this end, one or the other or both of the surfaces of the block 125 or the sidewall members 120 are grooved to form passageway opening into the mold cavity at a location corresponding to the bottom wall of the container 80 to be formed. The size of the openings into the mold cavity are, of course, sufficiently small so that thermoplastic material is not drawn into the passages.

The overall operation of the mold structure and method of the present invention may be appreciated by referring initially to FIG. 2. The first and second mold means 104 and 106 are there shown in their separated or open condition at the conclusion of an operating cycle with a molded container 80 having been released from both sections of the mold so as to fall to a receiving table or conveyor (not shown). The platen 108 in the present structure remains stationary and the platen 107 commences its return movement to initite a succeeding operating cycle. The mold section 104 is guided toward a proper mating relationship with the opposed mold section 106 by the guide pin and bore arrangement 112, 118 and 114, 116. The hydraulic cylinders 161 and 163 are also actuated before or during the course of such return movement to displace the actuator plate 162 and thus correspondingly displace sidewalls 120–123 from their open position shown in FIG. 6 to a closed position as shown in FIG. 3.

The mold platen 108 is shown having completed its return movement in FIG. 3 and with the exemplary sidewalls 120 and 122 securely locked into place by the retaining block sets 127 and 130. The other sidewalls 121 and 123 are similarly secured. A vacuum may now be drawn in the mold cavity by a vacuum pump (not shown) coupled to the cavity through the passage way 162 and valve structure 164 (FIGS. 6b and 6d). The molten thermoplastic material is concurrently injected into the mold structure through the primary inlet sprue 142. As previously explained, the molten thermoplastic material flows through the bifurcated hot runner channels 144, 146 where it is permanently maintained in a melted condition by the cartridge type heaters 134, 136 to the sprues 148 and 150. The material continues its flow path through the respective U-shaped cold runner systems 98′ and 100′ (FIG. 4) and then through the various inlet gates 102′ and into the mold cavity. The concurrent introduction of the thermoplastic material on opposite sides of the cores and intermediate adjacent partition walls tends to prevent the cores 140 from "whipping," i.e., being biased from a true center position by differential pressure on opposite sides of the core. Such "whipping" results in undesired nonuniformity in thickness of the partition walls of the container. Most significantly, however, with the material entering the cavity at the secured ends of the cantilevered cores, it has been found that there is less tendency for hydraulic imbalance to occur on opposite sides of the cores than in prior art structures. This appears attributable to the fact that before the thermoplastic material flows to the free end of the cores the space at the fixed ends has already been filled thereby tending to preclude core displacement.

Once the injection cycle is complete, and the thermoplastic material has solidified, the mold platen 107 is again actuated to move in its reverse direction and with the internal ledges of the exemplary sidewalls 120 and 122 as well as the remaining sidewalls not visible in FIG. 3, engaging the outer perimeter of the open top of the molded container 80 to strip the container from the core members 140. All of the inner cores initially move with the sidewalls 120–123 so that there is initially only relative movement and thus stripping of the container from the outermost cores 140. After a short distance, the third and fifth cores reach their stop abutments and stripping is initiated from these cores. In a further distance the second and fourth cores intercept steps and stripping is now initiated as to these cores. This progressive stripping of the molded container from the core elements facilitates the ejection process. However, all of cores 140 may be fixedly secured to the support block 132 where the advantages of progressively stripping are not required.

The passageway 162 (FIG. 6b) is connected to an air pressure source during the ejection procedure so that pressurized air is introduced into the mold cavity through valves 164. The pressurized air aids in the ejection process but may be omitted in those environments where such refinement is unnecessary to satisfactory operation of the mold.

After the platen 107 has moved sufficiently away from fixed platen 108 so that the major portion of the casing 80 has been stripped from the cores 140, the pressure plate 162 is actuated to displace the sidewalls 120-123 outwardly to their open positions.

The sidewalls 120–123 are illustrated in their open positions in FIG. 6a and with the secondary ejector means 156 having just been actuated so that the gripper fingers engage the end portion of the casing and complete removal of the casing from the cores 140. The secondary ejector means 156 may now be deenergized and the casing 80 will fall from the mold onto a receiving conveyor or the like. The mold structure is again ready to repeat the operating sequence described.

The various time sequential operations described in running the mold through the complete operating cycle such as hydraulic motors 161, 163 and ejectors 156 are controlled from conventional electrical, mechanical and hydraulic control apparatus well known to those skilled in the art. For example, various adjustable microswitches may be positioned in the path of travel of the mold platen 107 so as to be operated at various positional locations of the mold structure. Accordingly, this well-known apparatus need not be explained in further detail.

While particular embodiments of the present invention have been shown and described, it is apparent that various changes and modifications may be made, and it is therefore intended in the following claims to cover all such modifications and changes as may fall within the true spriit and scope of this invention.

I claim:

1. An injection mold defining a mold cavity for manufacture of a plastic article having a plurality of sidewalls, said mold comprising:

first mold means comprising a plurality of sidewall members and a first end wall member defining a generally planar surface beneath said sidewall members and inwardly of said sidewall members defining a surface corresponding to one end of said mold cavity, said plurality of sidewall members being movable along respective guide means from a closed position in which first end portions of each of said sidewall members are contiguous said generally planar surface of said first end wall member and cooperate therewith to define a mold cavity conforming to at least a portion of the desired exterior dimensions of said article and an open position in which each of said sidewall members is displaced along said respective guide means to a location laterally outwardly of its closed position and in spaced relation to said first end wall member;

first interlocking means secured to said first end wall member at a location laterally outwardly of the closed positions of said sidewall members and extending upwardly from said generally planar surface for a distance corresponding to only a minor portion of the height of said sidewall members, said first interlocking means securely engaging said first end portions of each of said sidewall members in the closed positions of said sidewall members for precluding laterally outward displacement of said first end portions of said sidewall members under the pressure of injection of thermoplastic material into said mold cavity and said sidewall members sliding out of engagement with said first interlocking means upon movement of said sidewall members along said respective guide means to their open position to permit ejection of a molded article from said mold cavity;

second mold means comprising a second end wall member having a generally planar surface portion spaced from and parallel to said generally planar surface portion of said first end wall member for providing an abutment surface for the end portions of said sidewall members opposite said first end portion, and said second mold means being movable relative to said first mold means under the influence of a mold actuating means between a closed position in which said first and second mold means cooperate to define said mold cavity and an open position in which said first and second mold means are spaced from one another by a predetermined distance for permitting ejection of a molded article from said mold cavity; and second interlocking means secured to said second end wall member at a location laterally outwardly of the closed positions of said sidewall members and extending upwardly from said generally planar surface of said second mold member for a distance corresponding to only a minor portion of the height of said sidewall members, said second interlocking means securely engaging said opposite end portions of said sidewall members in the closed positions of said sidewall members for precluding laterally outward displacement of said opposite end portions of said sidewall members under said injection pressure and sliding out of engagement with said sidewall members upon divergent movement of said first and second mold means toward said open position under the influence of said mold actuating means.

2. The injection mold of claim 1 in which said first and second interlocking means have sloped face portions for engaging complementary face portions of said sidewall members when said sidewall members are in their closed position and are moved into engagement with said second mold means for releasably retaining said sidewall members in said closed position.

3. The injection mold of claim 2 in which said guide means comprises guide posts journalled in respective bores of said sidewall members for guiding said sidewall members between their open and closed positions.

4. The injection mold of claim 3 in which said first and second mold means cooperatively define a mold cavity of a configuration corresponding to an article having one end wall and an open top portion.

5. The injection mold fo claim 4 in which said second mold means further includes a plurality of core elements affixed to said second transverse end wall member and laterally spaced from one another by a predetermined distance for defining, in conjunction with said first mold means when said sidewall members are in said closed position, a mold cavity of a configuration corresponding to a rectangular enclosure having an open top, a closed bottom wall and a plurality of internal partition walls.

6. The injection mold of claim 5 and further including ejector means comprising an inwardly extending ledge on each of said sidewall members positioned thereon adjacent said first transverse end wall for engaging the perimeter of the open top of a molded container within the mold to strip the container from said core elements upon relative divergent movement of said first and second mold means.

7. The injection mold of claim 6 and in which said mold actuating means includes control means for displacing said four sidewall members from said closed to said open position upon divergent movement of said first and second mold means a predetermined distance.

8. The injection mold of claim 7 and further including secondary ejector means comprising a plurality of gripper elements supported by said first mold means, said secondary ejector means being actuated by said control means, upon said outward displacement of said four sidewall members for engaging said molded article and completing stripping of said article from said core members.

9. The injection mold of claim 1 and further including inlet means comprising a channel opening into said mold cavity at the transverse top surface of one of said core members for introducing air into said mold cavity to aid in ejecting a molded container therefrom and for drawing a vacuum in said cavity upon injection of said thermoplastic material.

* * * * *